United States Patent
Fitzgerald

(10) Patent No.: US 6,686,589 B2
(45) Date of Patent: Feb. 3, 2004

(54) FLUID DENSITY MONITOR

(75) Inventor: John Barry Fitzgerald, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 118 days.

(21) Appl. No.: 09/963,179

(22) Filed: Sep. 26, 2001

(65) Prior Publication Data

US 2002/0066856 A1 Jun. 6, 2002

(30) Foreign Application Priority Data

Oct. 5, 2000 (GB) .............................................. 0024334

(51) Int. Cl.[7] .............................. E21B 47/12; G01V 5/04
(52) U.S. Cl. ....................................... 250/256; 250/261
(58) Field of Search ................................ 250/256, 261, 250/227.11, 227.14, 227.24, 227.27, 262, 252.1, 269.1; 356/72, 328; 359/143

(56) References Cited

U.S. PATENT DOCUMENTS

| | | | |
|---|---|---|---|
| 3,688,115 A | 8/1972 | Antkiw | 250/71.5 R |
| 4,412,130 A | 10/1983 | Winters | 250/260 |
| 4,649,483 A * | 3/1987 | Dixon, Jr. | 702/12 |
| 4,717,825 A | 1/1988 | Smith, Jr. et al. | 250/256 |
| 4,856,584 A | 8/1989 | Seidner | 166/250 |
| 5,038,033 A | 8/1991 | Carroll et al. | 250/256 |
| 5,578,820 A | 11/1996 | Gadeken et al. | 250/256 |
| 6,037,585 A | 3/2000 | Gadeken | 250/262 |
| 6,281,489 B1 * | 8/2001 | Tubel et al. | 250/227.14 |
| 6,531,694 B2 * | 3/2003 | Tubel et al. | 250/227.14 |

FOREIGN PATENT DOCUMENTS

| | | | |
|---|---|---|---|
| EP | 081314 A2 | 11/1982 | G01V/5/00 |
| EP | 0442813 A2 | 2/1991 | E21B/47/00 |
| WO | WO 00/68652 | 5/2000 | G01F/1/74 |
| WO | WO 01/31328 A1 | 10/2000 | G01N/29/02 |
| WO | WO 01/31329 A1 | 10/2000 | G01N/29/02 |

OTHER PUBLICATIONS

Chemicals in the Oil Industry (1985), pp. 00365.1–00365.45, A. L. Smith, "Radioactive Scale Formation".

Naturwissenschafen (1939), pp. 11–15, O. Hahn et al., "On the Indentification and Properties of the Alkaline Earth Metals Produced by the Irradiation of Uranium with Neutrons".

SPWLA Seventeenth Annual Logging Symposium (1976), pp. 1–21, G. Marett et al., "Shaly Sand Evaluation Using Gamma Ray Spectrometry, Applied to the North Sea Jurassic".

* cited by examiner

Primary Examiner—Constantine Hannaher
Assistant Examiner—Otilia Gabor
(74) Attorney, Agent, or Firm—William L. Wang; William B. Batzer; John J. Ryberg

(57) ABSTRACT

A method of monitoring the density of a subterranean fluid comprises the steps of: using a subterranean radiation detector to obtain measurements over a plurality of time intervals of the amount of natural background radiation traversing said fluid, and calculating the relative density of said fluid at each of said time intervals from said measurements.

28 Claims, 7 Drawing Sheets

FLUID DENSITY MONITOR

FIELD OF THE INVENTION

The present invention relates to a fluid density monitor, and a method of monitoring fluid density.

BACKGROUND OF THE INVENTION

In order to produce efficiently from a hydrocarbon reservoir, it is desirable to monitor and control the movement of fluids in the borehole and in the reservoir.

Borehole fluid monitoring is usually performed by permanent devices such as downhole flowmeters and gradiomanometers. However, these require calibration, power supplies and involve complex equipment.

Reservoir fluid monitoring may be performed by electrical resistivity measurements on the bulk formation. These measurements can detect the replacement of hydrocarbon by conductive brine in formation porosity and so e.g. monitor the approach towards the borehole fluid inlet points of the water front (i.e. the boundary in the reservoir between the predominantly oil and predominantly water phases). However, because the electrical conductivities of oil and gas are similar, the technique is less useful for detecting the movement of the oil/gas front. Also the equipment for measuring electrical resistivity extends outside the borehole casing, which is inconvenient and increases cost and complexity.

Wireline radioactive logging is also used to evaluate hydrocarbon wells. Naturally occurring radioactivity is used to identify shale and non-shale zones by total gamma-ray count rates, and to determine mass concentrations of formation radioisotopes (mainly Th, U and K). Information obtained in this way can also be used e.g. to correlate zones in different wells and control depth when running other logging tools.

SUMMARY OF THE INVENTION

We have found that it is possible to monitor fluid densities by analysing natural background radiation traversing the fluid, the proportion of natural background radiation able to traverse the fluid being related to the density of the fluid. In general terms the present invention relates to a method and apparatus for monitoring subterranean (e.g. in formation or in a borehole) fluid densities by analysing natural background radiation traversing the fluid. In the following, by "relative density" we mean the density of a fluid calculated from one measurement relative to the density of the fluid calculated from other measurements.

In a first aspect, the present invention provides a method of monitoring the density of a subterranean fluid, comprising the steps of:

(a) using a subterranean radiation detector to obtain measurements over a plurality of time intervals of the amount of natural background radiation (typically gamma-ray radiation) traversing the fluid, and (b) calculating the relative density of the fluid at each of the time intervals from the measurements.

By monitoring fluid density in this way it is possible to detect changes in fluid density in the pores of a subterranean formation. Such changes may be associated with, e.g. the passage of a fluid front in a formation (such as a water front or an oil/gas front) in which the fluids to either side of the front have different densities. A particular advantage over electrical resistivity measurements is the ability to detect the presence of an oil/gas front, oil and gas generally having different densities.

Also, unlike the equipment for electrical resistivity measurements, which extends outside the wellbore casing, the detector of the present invention can be located entirely within a well bore and is therefore much less disruptive and invasive. Preferably the detector is located between the production tubing and the wellbore casing (e.g. mounted to a mandrel), where it does not interfere with hydrocarbon production, but other locations are also possible, such as within the production tubing or outside the casing (which generally involves cementing the detector to the casing).

Preferably the detector is held stationary so that the density is monitored at a specific location.

Preferably the detector is permanently or semi-permanently installed below ground (i.e. rather than being operated as part of a wireline tool), so that interruptions to hydrocarbon production caused by moving the detector into position are avoided.

The duration of each time interval may be at least ten minutes. However, the duration may be e.g. at least one hour or at least one day. Longer durations provide increased detection sensitivity, but clearly make density monitoring more time-consuming.

Gamma-ray detectors can be relatively simple and robust devices, comprising essentially a scintillator (e.g. a crystal of NaI(Tl)) and a photomultiplier in a suitable housing. They are, therefore, particularly suitable for permanent or semi-permanent downhole installation.

The method can also be used to monitor fluid density within a borehole e.g. so that water/oil ratios can be monitored.

Shielding may be provided around parts of the detector so that the natural background radiation arrives principally from only certain directions. For example, the detector may be shielded from the production tubing. This reduces the amount of detected radiation e.g. (i) received from tubing scale which contains naturally occurring radioactive material (NORM) and (ii) affected by changes in fluid density within the production tubing. In this way, the influence of formation pore fluid density changes on the measurements can be substantially isolated so that such changes can be better monitored.

Alternatively the detector may be shielded so that to a significant extent it only receives background radiation which has traversed the production tubing. This allows the detector principally to monitor fluid densities within the production tubing rather than in the formation.

A particular advantage of the present invention is that the detector does not need to be provided with a dedicated source of radiation, such as an artificial gamma-ray source or an X-ray generator. This reduces equipment cost, complexity and power consumption.

Preferably the method further comprises the step of performing a spectroscopic analysis of the radiation arriving at the detector to distinguish naturally occurring formation radioisotopes from other sources of activity, such as NORM in production tubing scale.

In a second aspect, the present invention provides a method of locating the position of a subterranean fluid front, comprising the steps of:

(a) using a plurality of spaced subterranean radiation detectors to obtain respective measurements of the amount of natural background radiation traversing said fluid during a time interval, (b) calculating a relative density of said fluid from each of said measurements, and (c) correlating the position of a change in the relative density of said fluid with the position of said fluid front.

The advantages, optional preferred features and alternative embodiments discussed above in relation to the first aspect of the invention apply also to this aspect of the invention.

Preferably the method further comprises the step of:

(d) repeating steps (a) to (c) for subsequent time intervals to track the progress of said fluid front.

So by deploying an array of detectors it is possible not only to detect and locate a fluid front, but also to track the movement of that front, e.g. as the front moves sequentially past some or all of the detectors.

Indeed, sequential detection of fluid density changes by some or all of the detectors is characteristic of the movement of a fluid front. This allows natural background radiation arriving at the detectors to be distinguished from other (static) sources such as NORM in scale.

In a third aspect, the present invention provides an apparatus for monitoring the density of a subterranean fluid, comprising a radiation detector and a signal processor. The radiation detector is adapted to obtain measurements over a plurality of time intervals of the amount of natural background radiation traversing said fluid, and is further adapted to send corresponding measurement signals to the signal processor. The signal processor is adapted to receive the measurement signals and configured to calculate the relative density of the fluid at each of the time intervals from the measurement signals.

The signal processor may be a programmable computer suitably programmed to calculate the relative density of the fluid. Alternatively the processor may comprise dedicated hardware, e.g. based on ROM, for performing the calculation.

The detector may have protective shielding which is adapted, in use, substantially to prevent radiation arriving at the detector from certain directions.

The signal processor may also be configured to perform a spectroscopic analysis of the measurement signals to distinguish the natural background activity from radiation traversing the fluid from other sources of radiation, such as NORM in scale.

Preferably the detector is adapted to be held stationary at a specific location in a hydrocarbon well. More preferably the detector is adapted to be permanently or semi-permanently installed below ground.

The detector may be adapted to be e.g. mounted to a hydrocarbon well production tubing, or cemented to a hydrocarbon well borehole casing.

The apparatus may further comprise a plurality of radiation detectors.

The apparatus is, therefore, suitable for performing the method of the first or second aspect of the invention.

BRIEF DESCRIPTION OF THE DRAWINGS

Specific embodiments of the present invention will now be described with reference to the following drawings in which.

DETAILED DESCRIPTION

Figure 1:
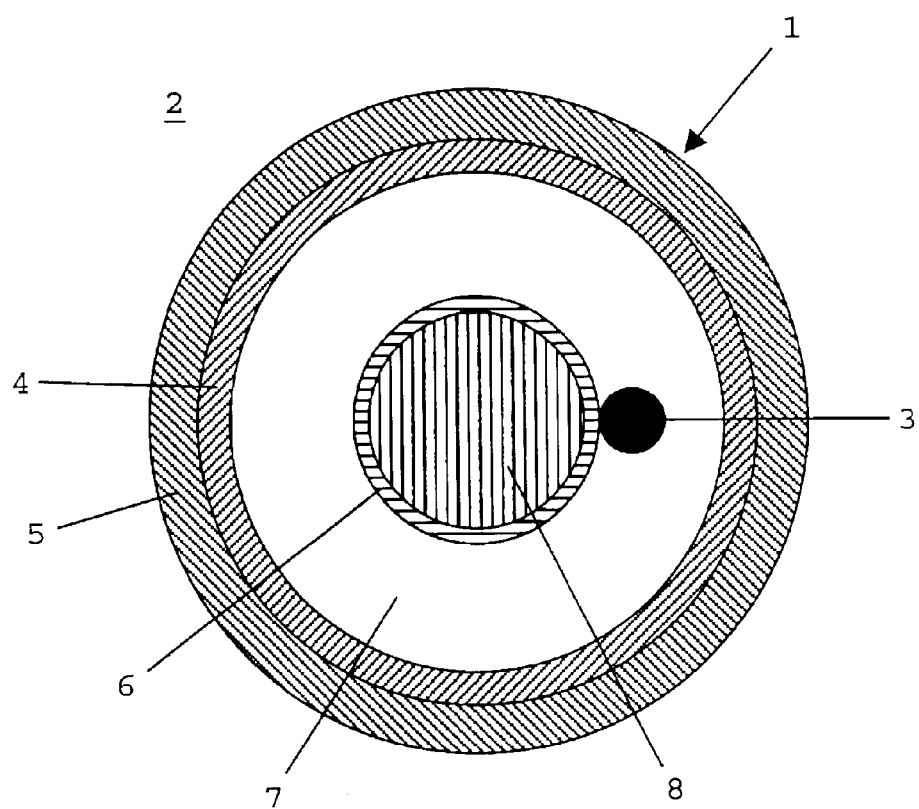
FIG. 1 shows a schematic transverse cross-section through a well borehole to illustrate a first embodiment of the invention.

Techniques for processing and analysing count rate signals are familiar to those skilled in the art. In general the count rate relates to the flux of gamma-rays from natural background radioactivity in the formation measured at a detector. Essentially, the flux of gamma-rays passing through a thickness x of a material of bulk density $\rho$ is given by $N=N_0 e^{-\mu\rho x}$, where $N_0$ is the initial flux entering the material and $\mu$ is a mass attenuation constant. So the count rate at the detector can be correlated to the density of the medium through which the detected gamma-rays have passed.

The depth of investigation is primarily limited by attenuation in the surrounding medium. However, although most detected gamma-rays originate close to the detector, the exponential term in x ensures that those which do reach the detector from greater distances are more strongly sensitive to density changes.

The bulk density of a formation is given by $\rho=\phi\rho_f+(1-\phi)\rho_{ma}$, where $\phi$ is the formation porosity, $\rho_f$ is the density of the formation pore fluid and $\rho_{ma}$ is the formation matrix density. Changes in the bulk density of a formation therefore reflect changes in the pore fluid, for example as a water front or oil/gas front approaches the borehole. This in turn affects the attenuation properties of the formation material and leads to a change in the flux reaching the detector of natural background gamma-rays from the formation.

Similarly, the bulk density (and hence attenuation properties) of fluid in production tubing depends on the densities and relative amounts of the components of the fluid.

Other sources of downhole environmental background radiation may need to be eliminated. Natural activity in formation water is generally at sufficiently low concentrations such as to be negligible, but if it precipitates out as borehole scale activity levels can increase. This activity, particularly in barium sulphate scales, is mainly due to radium salts as well as (depending on the permeability of the scale) daughter products of radium. However, the activity can be effectively eliminated via a number of approaches:

(1) As discussed below in respect of FIGS. 6a to c, the time dependence and location pattern of scale build-up and fluid front movements are in general different and distinctive. For example, sequential reductions in count rates from an array of detectors spaced along a borehole are characteristic of the arrival of a higher density fluid front. Scale is not expected to produce such sequential reductions.

(2) By shielding the detector, as discussed below in respect of FIGS. 2 and 4, the detector can be screened from undesired activity.

(3) By applying a number of discriminator thresholds to the gamma-ray detector signal output, spectroscopic analysis (as described e.g. by G. Marett et al., "Shaly Sand Evaluation Using Gamma Ray Spectrometry, Applied to the North Sea Jurassic", Trans. SPWLA Seventeenth Annual Logging Symposium, Jun. 9–12, 1976) of the natural background radiation can be performed. This allows activity due to formation isotopes (predominantly from the Th and U decay series and from K) to be distinguished from scale isotopes (predominantly radium isotopes, and particularly $^{226}$Ra and its daughter products). In general, scale contains extremely low levels of potassium due to the high solubility of most potassium salts. On the other hand, potassium is abundant in many minerals and has a distinctive gamma-ray line at 1.46 MeV, and so spectroscopic analysis of activity due to potassium is particularly convenient for distinguishing formation and scale activity. Therefore, monitoring the 1.46 MeV gamma-ray line, if necessary by spectral deconvolution techniques using a measurement response function (as described e.g. in the above-mentioned article by G. Marett et al.), provides a means to distinguish changes in formation activity count rates from scale build-up.

FIG. 1 shows a schematic transverse cross-section through a well borehole 1 in a subterranean formation 2 and illustrates a first embodiment of the invention. A gamma-ray detector 3 is located inside the borehole casing 4 and cement 5 and is mounted on the outside surface of the production tubing 6. It is immersed in borehole fluid 7 but does not interfere with the flow of produced fluids 8 within the production tubing.

Gamma-rays arrive at the detector from all directions and so the total amount of radiation measured by the detector is affected by fluid density changes both within the formation and within the borehole. However, for small diameter bores, or where the flow composition in the production tubing is well-known, the effect of borehole fluids on the total count rate may be negligible or can be corrected so that the detector essentially monitors only formation porosity fluid density.

Use of thinner or lower density casing or cement leads to less attenuation and therefore greater gamma-ray count rates.

Figure 2:
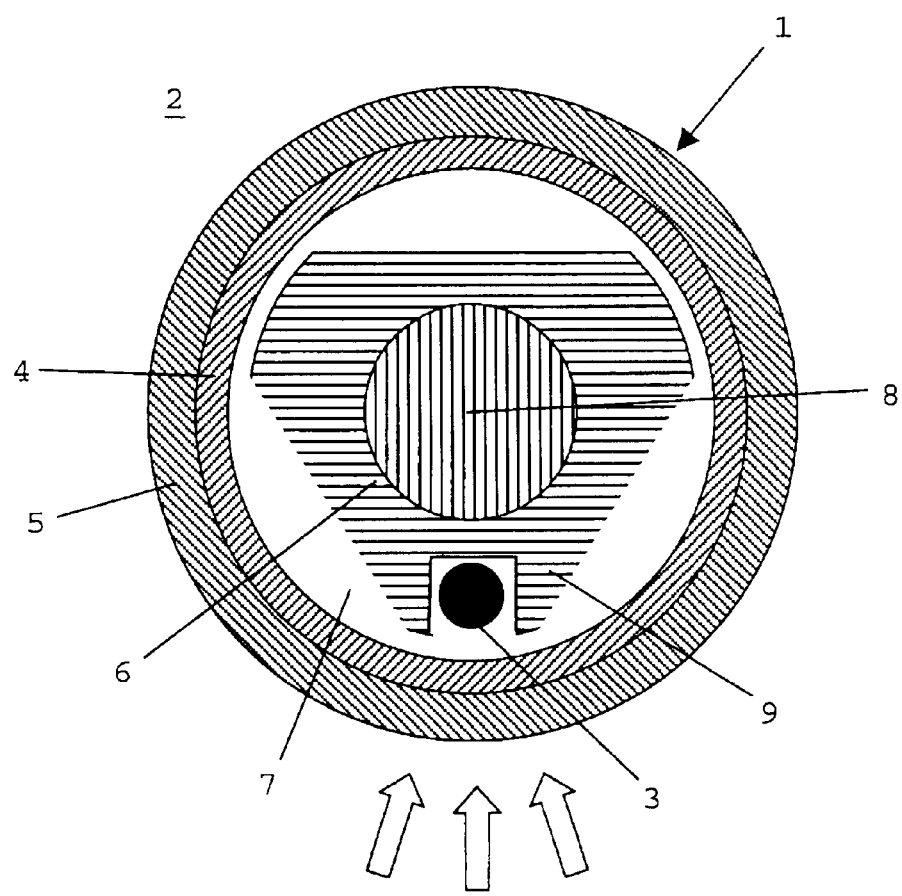
FIG. 2 shows another schematic transverse cross-section through a well borehole to illustrate a second embodiment of the invention.

FIG. 2 shows another schematic transverse cross-section through the well borehole 1 and illustrates a second embodiment in which the production tubing 6 has a steel mandrel portion 9, the gamma-ray detector 3 being adapted and dimensioned to fit within the mandrel portion. The highly attenuating nature of the steel means that the gamma-ray flux reaching the detector is predominantly along the directions indicated schematically by arrows.

Effectively the mandrel portion acts as a shield so that the detector is not significantly affected by events occurring in the production tubing. This embodiment is therefore particularly suitable e.g. when the production tubing has a relatively large diameter bore, or where the flow composition in the production tubing is not well-known. However, the mandrel portion does lead to lower total count rates compared with the embodiment of FIG. 1 in which activity from all sides of the borehole is sampled.

The mandrel portion also shields the detector from NORM activity from scaling within the production tubing. This radiation can be a problem because, at least in terms of total count rate, it can mask natural background activity from the formation. However, even if some NORM scale activity is measured by the detector, spectroscopic techniques (discussed above) can be used to distinguish the different contributions to the total count rate.

The shielding effect of the mandrel portion can be increased by including dense, high atomic number and highly attenuating (e.g. tungsten) absorbers at strategic locations, e.g. directly between the detector and the production tubing.

Figure 3:
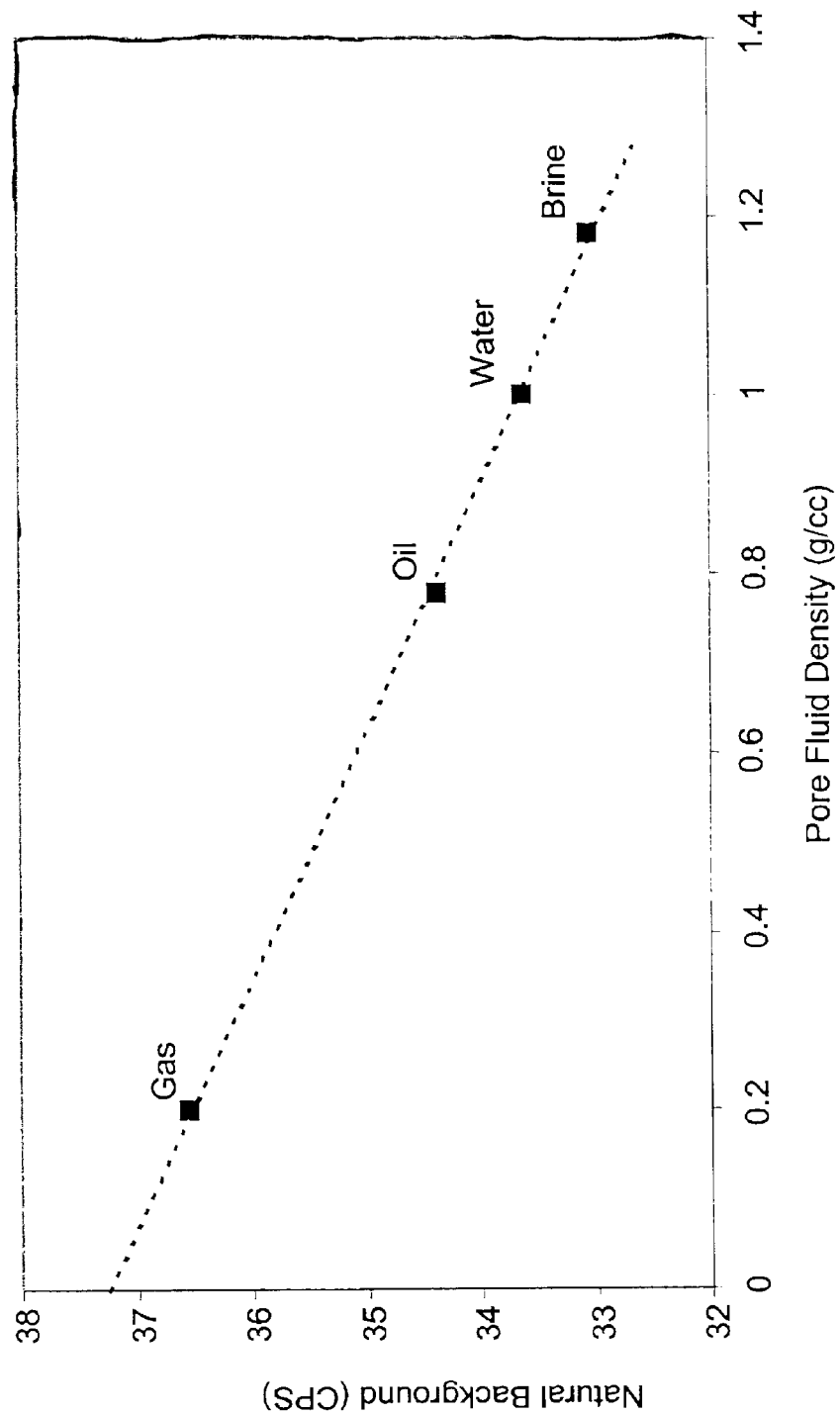
FIG. 3 is a graph showing calculated count rates for the detector of the embodiment of FIG. 2.

Count rates for the detector of the embodiment of FIG. 2 were modelled using detailed Monte Carlo gamma-ray transport simulations. The results are shown in the graph of FIG. 3, for a borehole having a standard steel casing surrounded by cement. The plot shows the gamma-ray counts per second (cps) in a 6" (15.2 cm) long by ¾" (0.84 cm) diameter NaI(Tl) detector as used in standard oilfield applications. The calculation assumes a formation matrix density of 2.65 g/cc, a formation porosity 20 pu (20%) and a formation activity 200 API-GR, the formation comprising by weight 12 ppm U, 24 ppm Th and 4% K. This is representative of highly active sandstone formations. Count rates are shown for four cases in which the pore fluid respectively consisted of (i) brine (150 kppm NaCl, 1.18 g/cc), (ii) water ($H_2O$, 1.0 g/cc), (iii) oil ($CH_2$, 0.778 g/cc) and (iv) gas ($CH_2$, 0.2 g/cc).

Count rates in the range of about 33–37 cps were calculated, with an oil-brine contrast of 1.34 cps (density difference 0.4 g/cc). With fluids of these densities, to detect the difference between brine- and oil-filled pores therefore requires a statistical count rate precision of better than 3%. A count rate precision of 1% is obtained with a total number of accumulated counts of 10,000. At 35 cps, this is obtained in 300 s or 5 min. Eliminating or reducing the thickness of the steel mandrel portion around the detector and increasing the detector volume to a standard 8"×1" (20.3 cm×2.54 cm) oilfield gamma-ray detector increases the count rate by up to a factor of 5, allowing the same determination to be made in 1 min. Equivalently, the same count rate precision requires 5 min in a relatively low activity 40 API-GR formation.

Of course, the identification of gas/liquid movements is more straightforward due to the greater density contrast.

High statistical precision can be obtained over even longer measurement periods. For example, for the 200 API-GR formation described above, count rate precision of better than 0.1% may be obtained in a few hours, which translates to a precision in measured pore fluid density of around 1%. The device can therefore detect even small changes in pore fluid density over relatively long periods.

Using the simulations, measurement periods were also correlated with detection sensitivities for $\rho_f$ (for the 40 API-GR formation). These correlations showed that a ±0.1 g/cc sensitivity requires a 25 min measuring period, a ±0.01 g/cc sensitivity requires 40 hr, and a ±0.002 g/cc sensitivity requires 1 month. However, longer measurement periods demand increased detector stability. A detector stability of about 0.11% is sufficient for the 25 min and 40 hr periods, but for the 1 month period greater stabilities may be needed.

Figure 4:
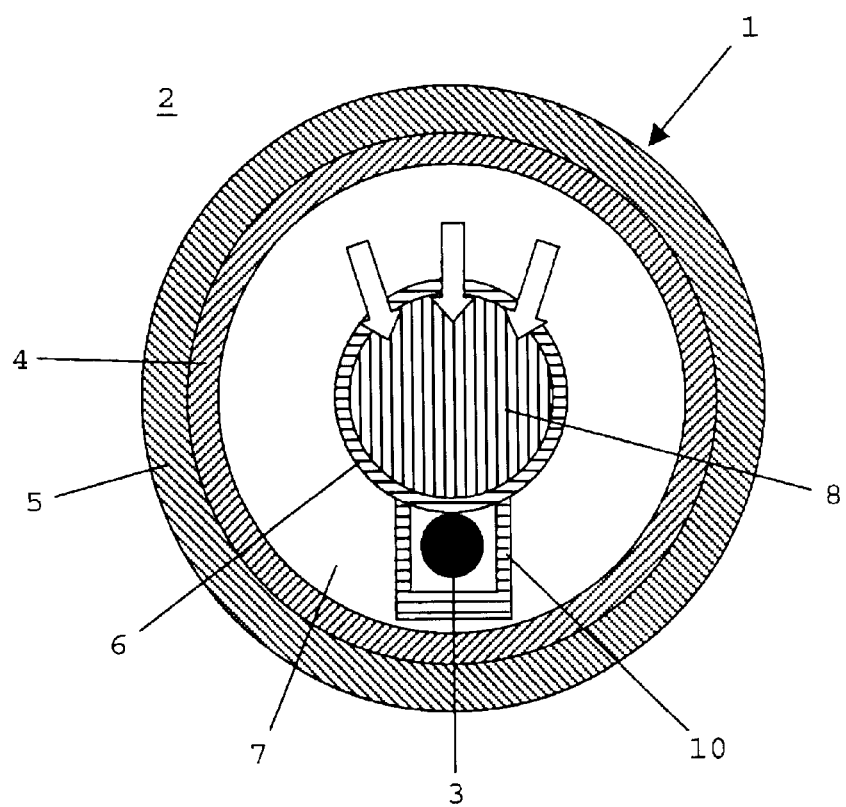
FIG. 4 shows another schematic transverse cross-section through a well borehole to illustrate a third embodiment of the invention.

FIG. 4 shows another schematic transverse cross-section and illustrates a third embodiment in which the detector 3 is set up primarily to monitor density changes within the bore of the production tubing 6. In this embodiment the detector is mounted on the outer surface of the production tubing and a shield 10 protects the detector from radiation which has not passed through production tubing. Again, the gamma-ray flux reaching the detector is predominantly along the directions indicated schematically by arrows. Of course, the passage of a fluid front in the formation on the side of the production tubing opposite the detector may also be registered by the detector.

Figure 5:
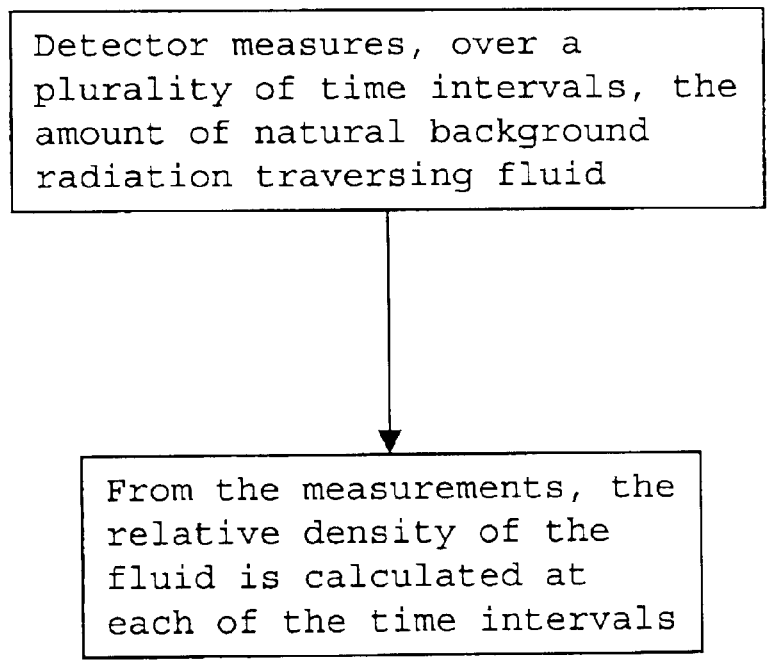
FIG. 5 is a flow chart showing the steps involved in monitoring fluid density using the detectors of FIGS. 1, 2 and 4, FIGS. 6a to 6c show sequential schematic longitudinal cross-sections through a well borehole fitted with a plurality of detectors.

FIG. 5 is a flow chart showing the steps involved in monitoring fluid density using the apparatuses of FIGS. 1, 2 and 4.

Measurement signals from each of the detectors of FIGS. 1, 2 and 4 are conveyed to a processor (not shown), such as an appropriately programmed computer or a dedicated hardware device, which may be located on the surface or in situ downhole. The signals communicate at least the total gamma-ray count rate measured by the detector, and the processor converts the signals into a measurement of the relative density or change in density. If spectroscopic analysis of the gamma-rays is to be performed, then the measurement signals also allow different gamma-ray energies to be discriminated. This can be accomplished by applying discriminator energy thresholds to the gamma-ray energy distribution. Essentially a respective count rate is measured for each threshold-delimited gamma-ray energy range.

Figures 6A, 6B, 6C:
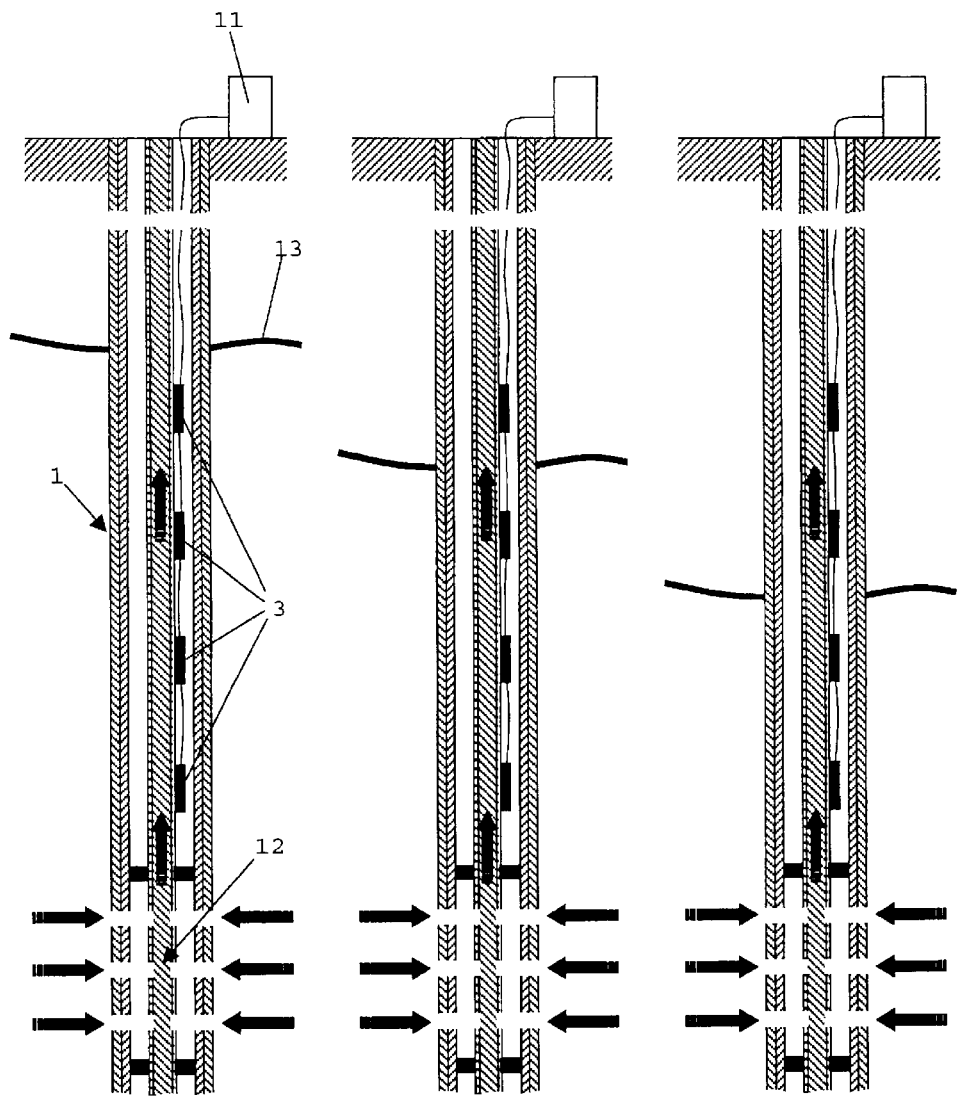

FIGS. 6a to c show sequential schematic longitudinal cross-sections through a well borehole 1. A plurality of detectors 3 (which may be of the type of the first, second or third embodiment discussed above) are spaced along the borehole. The detectors communicate with a surface processor 11 which processes and analyses the signals received from the detectors.

The detectors are positioned above a production zone 12. The general direction of movement of fluid from the formation, into the production zone and up the borehole is indicated by arrows.

In FIG. 6a an oil/gas front 13 is located above the upper detector. As oil is extracted from the formation the front moves downwards until it passes the upper detector (as shown in FIG. 6b). The increased count rate at the upper detector caused by the drop in pore fluid density around the detector tells the operator that a front may be approaching the production zone and warns him that he may need to take appropriate action. Such action may consist of reducing or changing the pattern of oil extraction to prevent further encroachment by the front. Alternatively the operator may accept the encroachment but shut down production from affected zones.

However, if the operator needs more evidence before taking such action, he can continue to extract oil to see if the next detector also eventually measures an increase in count rate. When this happens (FIG. 6c), he can be more confident that the count rate increases were caused by movement of the front.

If the front continues to move downwards, its position will be revealed by count rate increases at the third and fourth detectors.

A similar analysis may be performed if the detectors are monitoring the fluid density inside the tubing (i.e. as per the third embodiment discussed above).

Generally, sequential variation in count rate from spaced apart detectors characterises the movement of a front rather than other phenomena such as scale build up. Strategic positioning of the detectors allows the operator to track the progress of a front along predetermined sections of the borehole.

Figure 7:
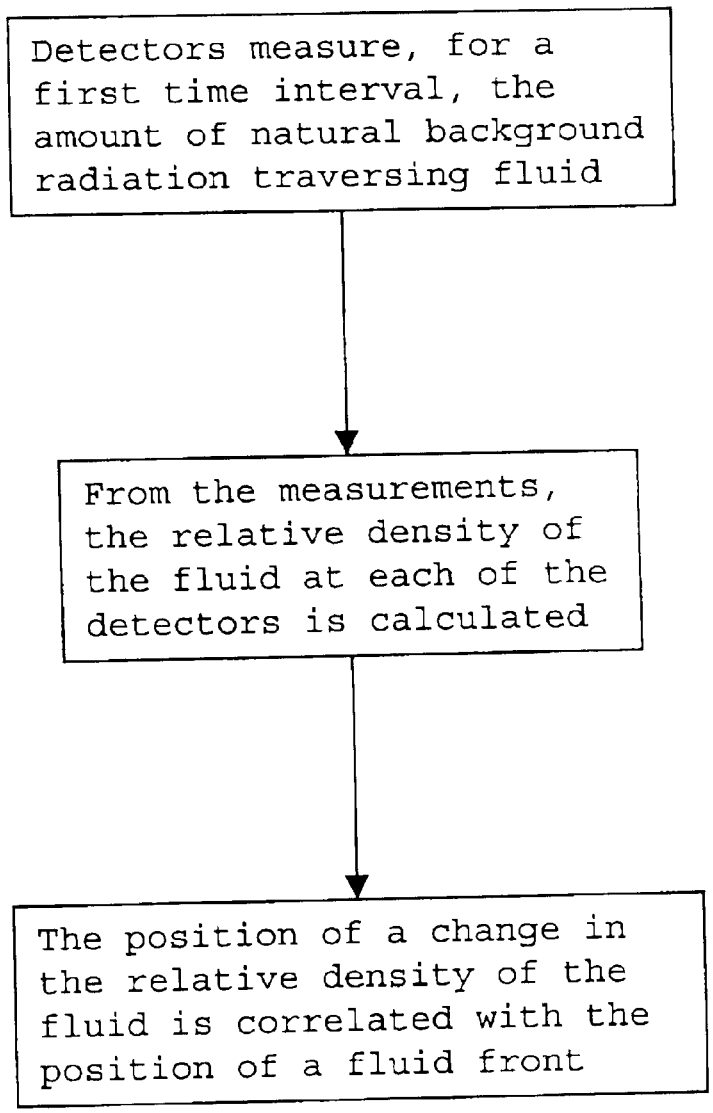
FIG. 7 is a flow chart showing the steps involved in monitoring fluid density using the apparatus of FIGS. 6a to 6c.

FIG. 7 is a flow chart showing the steps involved in monitoring fluid density using the apparatus of FIGS. 6a to c.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method of monitoring the density of a subterranean fluid, comprising the steps of:
   (a) using a subterranean radiation detector to obtain measurements over a plurality of time intervals of the amount of radiation from natural background radioactivity in the formation traversing said fluid, and
   (b) calculating the relative density of said fluid at each of said time intervals from said measurements.

2. A method according to claim 1, wherein said detector is stationary.

3. A method according to claim 1, wherein said detector is permanently or semi-permanently installed below ground.

4. A method according to claim 1, wherein said fluid is within the pores of a subterranean formation.

5. A method according to claim 1, wherein said fluid is within the production tubing of a hydrocarbon well.

6. A method according to claim 1, further comprising the step of performing a spectroscopic analysis of the natural background radiation detected by said detector to distinguish said natural background radiation from radiation from other sources of activity.

7. A method according to claim 1, wherein said time intervals are at least ten minutes.

8. A method according to claim 1 wherein the detector is adapted to measure primarily gamma ray or X ray radiation.

9. A method according to claim 8 wherein the detector is adapted to measure primarily gamma ray radiation.

10. A method of locating the position of a subterranean fluid front, comprising the steps of:
    (a) using a plurality of spaced subterranean radiation detectors to obtain respective measurements of the amount of radiation from natural background radioactivity in the formation traversing said fluid during a time interval,
    (b) calculating a relative density of said fluid from each of said measurements, and
    (c) correlating the position of a change in the relative density of said fluid with the position of said fluid front.

11. A method according to claim 10, further comprising the step of:
    (d) repeating steps (a) to (c) for subsequent time intervals to track the progress of said fluid front.

12. A method according to claim 10, wherein said detectors are stationary.

13. A method according to claim 10, wherein said detectors are permanently or semi-permanently installed below ground.

14. A method according to claim 10, wherein said fluid is within the pores of a subterranean formation.

15. A method according to claim 10, wherein said fluid is within the production tubing of a hydrocarbon well.

16. A method according to claim 10, further comprising the step of performing a spectroscopic analysis of the natural background radiation detected by said detectors to distinguish said natural background radiation from radiation from other sources of activity.

17. A method according to claim 10, wherein said time interval is at least ten minutes.

18. A method according to claim 10 wherein the detectors are adapted to measure primarily gamma ray or X ray radiation.

19. A method according to claim 18 wherein the detectors are adapted to measure primarily gamma ray radiation.

20. An apparatus for monitoring the density of a subterranean fluid, comprising:

a radiation detector; and a signal processor, said radiation detector being adapted to obtain measurements over a plurality of time intervals of the amount of radiation from natural background radioactivity in the formation traversing said fluid, and being further adapted to send corresponding measurement signals to said signal processor, and said signal processor being adapted to receive said measurement signals and configured to calculate the relative density of said fluid at each of said time intervals from said measurement signals.

21. An apparatus according to claim 20, wherein said signal processor is further adapted to perform a spectroscopic analysis of the natural background radiation detected by said detector to distinguish said natural background radiation from radiation from other sources of activity.

22. An apparatus according to claim 20, wherein said detector is adapted to be held stationary at a specific location in a hydrocarbon well.

23. An apparatus according to claim 20, wherein said detector is adapted to be permanently or semi-permanently installed below ground.

24. An apparatus according to claim 20, wherein said detector is adapted to be mounted to a hydrocarbon well production tubing.

25. An apparatus according to claim 20, wherein said detector is adapted to be cemented to a hydrocarbon well borehole casing.

26. An apparatus according to claim 20, further comprising a plurality of said radiation detectors.

27. An apparatus according to claim 20 wherein the detector is adapted to measure primarily gamma ray or X ray radiation.

28. An apparatus according to claim 27 wherein the detector is adapted to measure primarily gamma ray radiation.

* * * * *